G. BIDONDE.
HYDROCYCLE.
APPLICATION FILED AUG. 22, 1919.

1,322,403.

Patented Nov. 18, 1919.

WITNESSES

INVENTOR
G. Bidonde
BY
ATTORNEYS

UNITED STATES PATENT OFFICE.

GRATIEN BIDONDE, OF NEW YORK, N. Y.

HYDROCYCLE.

1,322,403. Specification of Letters Patent. Patented Nov. 18, 1919.

Application filed August 22, 1919. Serial No. 319,148.

*To all whom it may concern:*

Be it known that I, GRATIEN BIDONDE, a citizen of the United States, and a resident of the city of New York, Richmond Hill, borough of Queens, in the county of Queens and State of New York, have invented a new and Improved Hydrocycle, of which the following is a full, clear, and exact description.

This invention relates to improvements in hydrocycles, an object of the invention being to provide a device of the character stated which will float, which will sustain the weight of the rider and which can be propelled through the water.

A further object is to provide a device of the character stated, which can be taken apart, packed in a relatively small space so that it can be easily transported from place to place and assembled at the water's edge by anyone of average intelligence, not requiring skilled labor.

With these and other objects in view the invention consists in certain novel features of construction, and combinations and arrangements of parts, as will be more fully hereinafter described and pointed out in the claims.

In the accompanying drawings—

Figure 1:
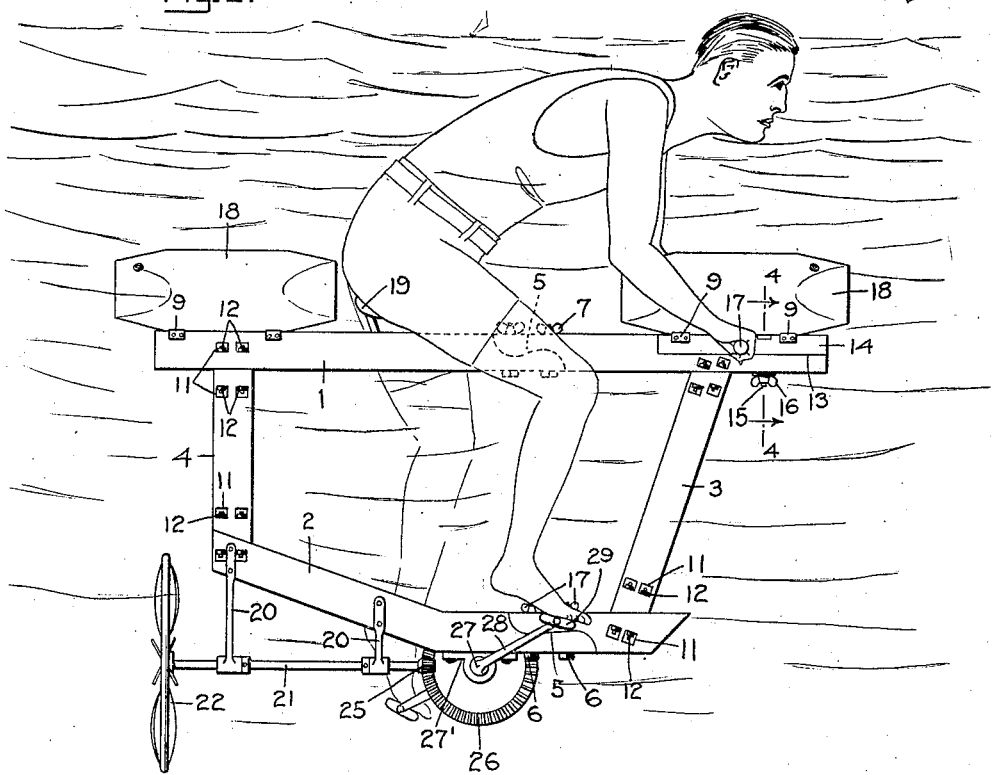
Figure 1 is a view in elevation illustrating my improvements.
Figure 2:
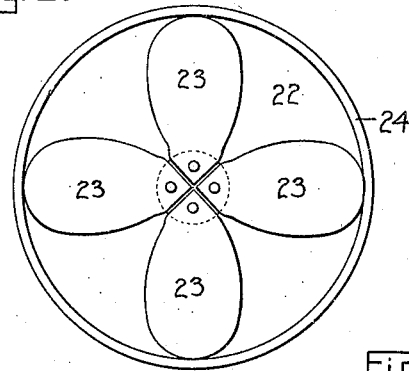
Fig. 2 is a view of the propeller 22.
Figure 3:
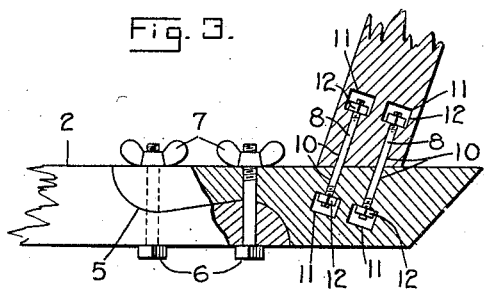
Fig. 3 is a fragmentary view partly in elevation and partly in longitudinal section illustrating the forward end of the lower bar 2.
Figure 4:
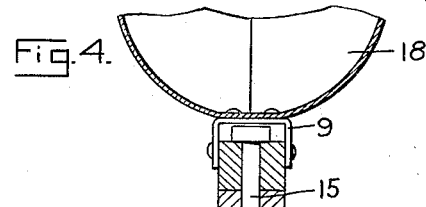
Fig. 4 is an enlarged view in transverse section on the line 4—4 of Fig. 1.
Figure 5:
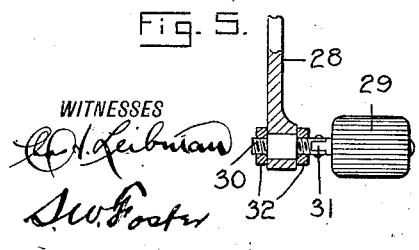
Fig. 5 is a fragmentary view partly in section through the crank arm 28 showing the manner of connecting the pedal thereto.

My improved hydrocycle employs a frame consisting of an upper bar 1, a lower bar 2 and front and rear standards 3 and 4 connecting the bars 1 and 2. The bars 1 and 2 are preferably made in two sections having overlapping joints 5 which are secured together by bolts 6 and wing nuts 7. The ends of the standards 3 and 4 are secured to the bars 1 and 2 by means of bolts 8 and these bolts are projected through alined openings 10 in the parts and have nuts 12 screwed onto their threaded ends, the ends of the bolts and the nuts being positioned in recesses 11 in the bars and standards so as to permit a free manipulation of the nuts either to assemble or disconnect the parts.

The bar 1 at its forward end is recessed, as shown at 13, to receive a block 14, the latter secured to the bar by means of the bolt 15 and nut 16 and the said block 14 is adapted to clamp a handle bar 17 in place, as indicated in Fig. 1.

A pair of tanks 18 are secured on the bar 1 and block 14 respectively and these tanks may contain any desired gas or air to render them buoyant and float the hydrocycle when in use. The tanks 18 are secured to the bar 1 and block 14 by means of straps 9 and a seat 19 is provided on the bar 1 as shown.

A pair of bearing brackets 20 are secured to the bar 2 and support a shaft 21 carrying a propeller 22 at its rear end. The propeller 22 is formed by a series of independent blades 23 connected at their outer ends by a ring 24. A pinion 25 is secured to the forward end of shaft 21 and is driven by a gear wheel 26 on a crank shaft 27 supported in a bearing bracket 27' on bar 2.

The shaft 27 has crank arms 28 thereon supporting pedals 29 and these pedals 29 are mounted on bolts 30 having hinged joints 31 between their ends. Nuts 32 on the bolts 30 are positioned at opposite sides of the crank arms 28 and secure the parts together. It is, of course, to be understood that the hinged joint 31 permits the pedals to fold in one direction only.

The bolts 30 have rotary mounting in the crank arms 28, but the pedals 29 are rigidly fixed to the bolts so that while the pedals are maintained horizontally at all times during the normal operation, the changing positions of the crank arms are accommodated by the rotary connections of the bolts therewith.

Fig. 1 illustrates the operative position of the hydrocycle, the seat 19 supporting the rider who grips the handle bar 17 and operates the pedals 29 with his feet to turn the propeller 22 and drive the device through the water.

When the device is not desired for use, the bars 1, 2, 3 and 4 can be disconnected, or, if desired, the hydrocycle can be divided simply by removing the nuts 7 and bolts 6. The parts are so constructed that they can be readily disconnected and connected and when disconnected, can be packed into a relatively small space and carried from place to place.

Various slight changes may be made in the general form and arrangement of parts described without departing from the invention, and hence I do not limit myself to the precise details set forth but consider myself at liberty to make such changes and alterations as fairly fall within the spirit and scope of the appended claims.

I claim:

1. A hydrocycle, comprising upper and lower bars, standards connecting the bars each made in sections separably connected, devices removably connecting the standards and the bars, tanks on the upper bar, and propelling means supported on the lower bar.

2. A hydrocycle, comprising upper and lower bars, standards connecting the bars, tanks on the upper bar, a seat on the upper bar, propelling means on the lower bar, and said upper and lower bars each made in two sections separably connected.

3. A hydrocycle, comprising upper and lower bars, standards connecting the bars, a removable block secured to the upper bar, a handle bar clamped between the block and the upper bar, tanks secured to the upper bar, and propelling mechanism on the lower bar.

4. A hydrocycle, comprising a frame, floats supporting the frame, a propeller, a shaft operating the propeller, a crank shaft, intermeshing gears connecting the crank shaft and the first-mentioned shaft, and pedals connected to the crank shaft, and each pedal having a hinged connection permitting the pedal to be hinged in one direction only.

GRATIEN BIDONDE.